Patented Feb. 13, 1923.

1,444,865

UNITED STATES PATENT OFFICE.

CHARLES E. BRADLEY, OF MONTCLAIR, AND SIDNEY M. CADWELL, OF LEONIA, NEW JERSEY, ASSIGNORS TO THE NAUGATUCK CHEMICAL COMPANY, A CORPORATION OF CONNECTICUT.

PROCESS FOR TREATING RUBBER AND PRODUCTS OBTAINED THEREBY.

No Drawing.     Application filed April 18, 1921. Serial No. 462,399.

*To all whom it may concern:*

Be it known that we, CHARLES E. BRADLEY and SIDNEY M. CADWELL, both citizens of the United States, and residents of Montclair, county of Essex, and State of New Jersey, and Leonia, county of Bergen, and State of New Jersey, respectively, have invented certain new and useful Improvements in Processes for Treating Rubber and Products Obtained Thereby, of which the following is a full, clear, and exact description.

This invention relates to the acceleration of vulcanization of rubber and more particularly to acceleration employing the reaction products of amines and aldehydes.

In the co-pending application of Cadwell, Serial No. 376,659, filed Apr. 26, 1920, there is set forth a process of vulcanization employing an accelerator consisting of the reaction products of the aliphatic straight chain aldehydes containing more than one carbon atom in the chain and an amine. One example of the material employed is the reaction product of acetaldehyde and aniline. The accelerators set forth in that co-pending application have in general excellent properties including substantial freedom from prevulcanization during milling, produce rapid vulcanization when employed in small quantities, may be manufactured by simple methods, and constitute generally inexpensive accelerators.

The principal object of the present invention is to provide a process of vulcanization employing accelerators which will possess the good properties in greater or less degree of accelerators set forth in that co-pending application and shall be capable of accelerating vulcanization in the so called air-cure. Another object of the invention is to provide such a process employing an accelerator which may be combined with the rubber with great ease and where the accelerator has an objectionable odor which is sometimes the case with accelerators of this type such odor has been substantially done away with.

The invention accordingly consists of a process for vulcanization of rubber which comprises combining a vulcanizing agent with rubber and a formaldehyde condensation product of an aliphatic amine and vulcanizing the rubber; and products obtained therefrom.

In carrying out the invention in its preferred form, 100 parts rubber, 100 parts of zinc oxide, 7 parts of sulphur and 2 parts of the product derived from the addition of stearic acid to triethyltrimethylenetriamine are mixed by milling in the usual manner and vulcanized in open air at a temperature of 275° F. for two and a half hours in the usual manner.

Triethyltrimethylenetriamine may be formed by condensing formaldehyde and ethylamine according to a method heretofore described in the literature. The stearic acid addition product may be made by thoroughly mixing an equal weight of molten stearic acid with the triethyltrimethylenetriamine and cooling the mass after reaction has taken place.

Triethyltrimethylenetriamine is one of a number of similar products which may be used in connection with this process. Other similar products are:—the condensation product of benzylamine and formaldehyde, tribenzyltrimethylenetriamine; the condensation product of diethylamine and formaldehyde, tetraethylmethylenediamine; and of piperidine and formaldehyde, dipiperidylmethylenediamine.

It will be observed that the formaldehyde condensation products with aliphatic amines sometimes undergo a change which may occur simply upon storage under ordinary conditions. This change results in the formation of polymers of the condensation products and it will be understood accordingly that when the expression "formaldehyde condensation products of an aliphatic amine" or similar expression is employed that it is intended also to include such condensation product alone or in combination with one or more polymers of such product, or one or more polymers of the product substantially without the presence of any of the simple condensation product. The formation of polymers of the condensation product is comparable with the well-known formation of polymers of formaldehyde.

It will be observed that the preferred example herein given and two of the other members mentioned are primary amines. These primary amine condensation products appear to be more active than the secondary amine condensation products, particularly in connection with the air-cure.

The products of the condensation as such are apt to have an objectionable odor and in order to overcome this odor various materials have been used. As noted in the preferred example stearic acid which forms a soap with the condensation products has been employed with success. The stearic acid addition product is unctuous and permits easy incorporation by milling. Other materials which may be used to alter the disagreeable odor of these substances are zinc acetate, calcium acetate, zinc hydroxide, aluminum chloride, cobalt chloride, lead acetate, magnesium acetate, sodium acetate, zinc chloride. In the case of the stearic acid the material is melted and added to approximately an equal weight of the oil which is the condensation product whereupon the addition product results. In the case of the other substances mentioned a water solution or suspension of these materials is added to an equal molecular amount of the compound in aqueous solution. The mixture is evaporated on a water bath until the desired consistency is obtained. In general it is believed that various other salts will give satisfactory results. The salt of a weak acid is preferred. In the case of the addition product of triethyltrimethylenetriamine and zinc acetate, the material is a viscous liquid having a slight odor of amine but no sharp or disagreeable odor. It seems to be stable and contains about 30% of the triethyltrimethylenetriamine. It will be obvious that in place of stearic acid palmitic acid or oleic or other well-known material giving a radical which when combined with a base will produce a soap may be employed. The compound of stearic acid and triethyltrimethylenetriamine and corresponding substances mentioned herein are ammonia derivatives combined with soap forming acid radicals.

The process is a simple one. The use of the stearic acid compound of triethyltrimethylenetriamine possesses a particular value in that it is a soap and possessing the properties of a soap may be easily milled into the rubber. It is non-poisonous, has an unobjectionable odor and is relatively inexpensive to manufacture. It will be observed that a small quantity effects vulcanization in a relatively short time and it has been found in milling it into rubber that it is substantially free from tendency to prevulcanization.

It will thus be seen that among others the objects of the invention set forth are achieved.

As many apparently widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:

1. The process of treating rubber which comprises combining with rubber a vulcanizing agent and a formaldehyde condensation product of an aliphatic amine, and vulcanizing the rubber.

2. The process of treating rubber which comprises combining with the rubber a vulcanizing agent and a formaldehyde product of a primary aliphatic amine, and vulcanizing the rubber.

3. The process of treating rubber which comprises combining with rubber a vulcanizing agent and a formaldehyde condensation product of ethyl amine, and vulcanizing the rubber.

4. The process of treating rubber which comprises combining 100 parts of rubber, 100 parts of zinc oxide, 7 parts of sulphur, and 2 parts of stearic acid addition product of triethyltrimethylenetriamine, and vulcanizing the rubber.

5. The process of treating rubber which comprises combining 100 parts of rubber, 100 parts of zinc oxide, 7 parts of sulphur, and 2 parts of stearic acid addition product of triethyltrimethylenetriamine, and vulcanizing the rubber in air at a temperature of 275° F.

6. The process of preparing accelerators which comprises combining with a condensation product of formaldehyde and an aliphatic amine a substance comprising a soap forming acid radical and substantially deodorizing the condensation product.

7. The process of preparing accelerators which comprises combining stearic acid with a formaldehyde condensation product of an aliphatic amine and substantially deodorizing the condensation product.

8. The process of preparing accelerators which comprises combining with a condensation product of formaldehyde and ethyl amine stearic acid and recovering the product of the combination.

9. The process of vulcanizing rubber which comprises combining with rubber an accelerator in the form of a soap including an ammonia derivative combined with a soap forming acid radical.

10. The process of treating rubber which comprises combining with rubber a condensation product of formaldehyde and an aliphatic amine combined with a soap forming acid radical, and vulcanizing the rubber.

11. The process of treating rubber which comprises combining with rubber a stearic acid addition product as an accelerator, and vulcanizing the rubber.

12. Vulcanized rubber derived from rubber combined with a vulcanizing agent and a formaldehyde condensation product of an aliphatic amine.

13. Vulcanized rubber derived from rubber combined with a vulcanizing agent and a formaldehyde condensation product of ethyl amine.

14. Vulcanized rubber derived from rubber combined with 100 parts of rubber, 100 parts of zinc oxide, 7 parts of sulphur and 2 parts of stearic acid addition product of triethyltrimethylenetriamine.

15. A vulcanized rubber derived from rubber combined with an accelerator consisting of a soap comprising an ammonia compound in combination with a soap forming acid radical.

16. A vulcanized rubber derived from rubber combined with a formaldehyde condensation product of an aliphatic amine combined with a soap forming acid radical.

17. Vulcanized rubber derived from rubber combined with a stearic acid addition product as an accelerator.

18. The process of preparing accelerators which comprises combining with the condensation product of formaldehyde and an aliphatic amine possessing a distinctive odor, a deordorant adapted to combine therewith.

Signed at New York, New York, this 13th day of April, 1921.

CHARLES E. BRADLEY.
SIDNEY M. CADWELL.